March 12, 1935. G. W. CLARK 1,994,303
HANDLEBAR POST FOR BICYCLES
Filed Feb. 27, 1934
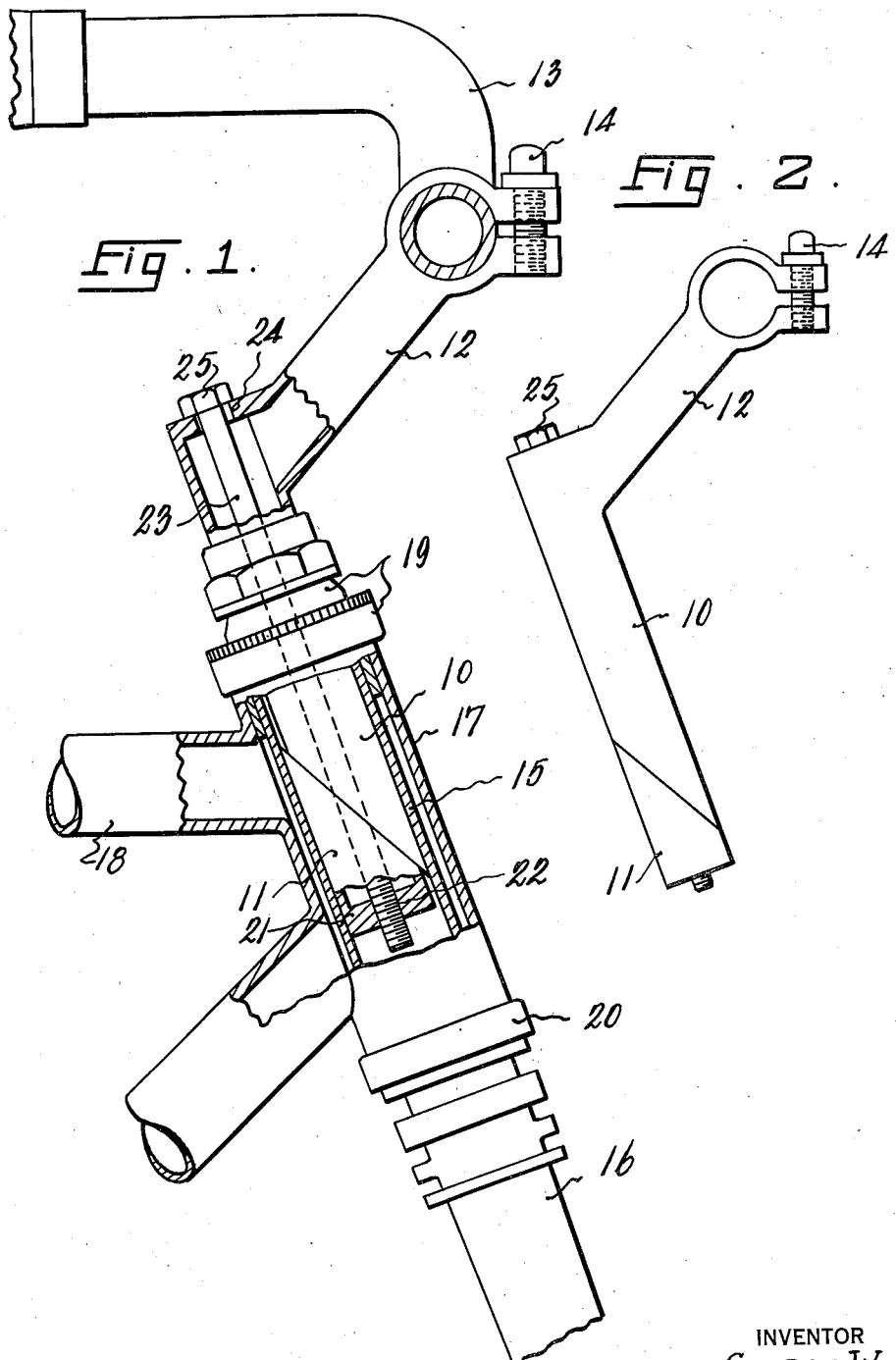
INVENTOR
GEORGE W. CLARK
BY Chapin + Neal
ATTORNEYS Patented Mar. 12, 1935

1,994,303

UNITED STATES PATENT OFFICE 1,994,303

HANDLEBAR POST FOR BICYCLES

George W. Clark, Westfield, Mass., assignor to The Westfield Manufacturing Company, Westfield, Mass., a corporation of Massachusetts Application February 27, 1934, Serial No. 713,135

2 Claims. (Cl. 208—115)

This invention relates to handlebar posts for bicycles and has for its principal object an improved means for holding the post in adjusted position in the tubular steering column of the bicycle. The handlebar posts are usually made in the form of a hollow tube and it has been customary in the past to hold the post in the frame by splitting the lower portion of the post and inserting a generally conical expanding member in the split end, which member is adapted to be drawn upwardly into the post by a bolt extending through the tube, and having a squared or polygonal head exposed at the upper end of the post to which a wrench may be applied to rotate the bolt and draw the conical expanding member into the post to spread the split end of the post into tight engagement with the walls of the steering column. This manner of holding the post in the steering column has certain disadvantages, the principal of which is the substantial line contact which the expanded end of the post makes with the walls of the hollow column, which renders the clamping action unreliable. Furthermore, the inside diameter of the portion of the column which receives the post must be sufficiently larger than the normal outside diameter of the post to permit easy insertion of the post and, as a result, the post has a tendency to "rock" since the line contact of the expanded end of the post with the column is insufficient to sustain the forces applied to the upper end of the post tending to tip the post sideways, the post acting as a lever to multiply the force applied. When continually retightened, the split end of the post tends to bite into the walls of the column and thereafter the post tends to return to the old groove when the attempt is made to clamp it in a slightly higher position. Great force must be applied to the bolt of such a holding device to secure any substantial degree of security. These disadvantages are to a very large extent overcome and positive advantages in the way of greater rigidity, greater security with less force applied in the tightening operation, and greater ease and speed in assembly are secured by the present invention. These and further objects and advantages of the invention will be apparent from the following specification and claims.

In the accompanying drawing which illustrates the invention in one embodiment—

Fig. 1 is a side view partly in section showing the post in clamped relation with the steering column and the bicycle frame member; and Fig. 2 is a side view of the post, on a smaller scale, showing the parts of the post in position for inserting in the frame.

Referring to the drawing, the post is shown as comprising an upper part 10 and a lower part 11. Both parts are hollow and cyvlindrical in cross-section and the upper part 10 is provided with an inclined projecting portion 12 terminating in a split ring type of clamp in which the handlebar 13 is secured by clamping screw 14 in the usual manner. As best shown in Fig. 2, the parts 10 and 11 are separated on a plane steeply inclined to the axis of the post and when the axes of the two parts are aligned, as shown in Fig. 2, the parts form a true cylinder which may be slipped into the upper end of the steering column 15, forming part of the front fork 16 of the bicycle, and rotatably mounted in the forward portion 17 of the bicycle frame 18. The frame portion 17 is provided at its upper and lower ends with suitable bearings (not shown in detail but indicated at 19 and 20) in which the steering column turns. The lower end of member 11 of the post is closed or plugged as at 21 and the closed end is provided with a central threaded opening 22 forming a fixed nut to receive the threaded end of a bolt 23. The bolt 23 extends through the post and passes through an inwardly flanged opening 24 in the upper end of member 10, terminating in a bolt head 25 of larger diameter than opening 24. When the parts have been assembled as shown in Fig. 2, and the post inserted in the steering column 15 position in the frame portion 17, rotation of bolt 23 to advance it into and through the threaded end 21 of member 11 will draw the parts 10 and 11 toward each other, the inclined plane of separation camming the parts sideways, as shown in Fig. 1, into tight contact with the inner surface of the column 15.

It will be noted that the surfaces in contact are substantial, extending the full length of member 11 and the full length of the portion of member 10 within the column. It will also be noted that the diameter of opening 24 is somewhat larger than the diameter of the bolt 23, permitting the bolt to move sideways with the sideways movement of member 11 so that no bending or tilting strain is applied to the bolt. The long longitudinal contact of the clamping surfaces prevents any tendency of the post to rock within the column, does not require excessive tightening of bolt 23, and does not create any tendency to deform the inner surface of the column. As a result, a more secure and dependable connection between the post and steering column is obtained, the assembly of the parts is more easily and quickly effected, and subsequent adjustment of the post is not hampered by any tendency of the post to return to its old position.

I claim:—

1. A steering wheel assembly for bicycles which comprises, a hollow steering column rotatably mounted in the bicycle frame, a hollow cylindrical handlebar post, inwardly flanged at its upper end and provided with a fixed nut at its lower end, fitting within the steering column, said post being divided into two parts along a plane steeply inclined to the longitudinal axis of the post, and a headed bolt passing lengthwise through the post with its head engaging the flange at the upper end of the post and its lower end threaded into the nut, whereby turning of the bolt will draw the two parts of the post toward each other and cause the parts to move transversely along the inclined plane of separation to force the parts into immovable engagement with the inner wall of the steering column, the diameter of the opening at the upper end of the post being sufficiently larger than the diameter of the bolt to permit the bolt to move freely sideways with the lower part of the post.

2. A steering wheel assembly for bicycles comprising a hollow steering column rotatably mounted in the bicycle frame, a hollow cylindrical handlebar post inwardly flanged at its upper end and provided with a fixed nut at its lower end fitting within the steering column, the inwardly flanged part having an opening therein in alignment with the fixed nut, said post being divided into two parts along a plane steeply inclined to the longitudinal axis of the post, a headed bolt passing longitudinally through the post with its head engaging the flange at the upper end of the post, and its lower end threaded into the nut, whereby turning of the bolt will draw the two parts of the post toward each other and cause the parts to move transversely along the inclined plane of operation to force the parts in opposite directions into frictional engagement with the inner wall of the steering column, the opening in the upper end of the post having at least one width dimension larger than the diameter of the bolt permitting the bolt to move bodily sideways with the lower part of the post.

GEORGE W. CLARK.